United States Patent [19]

Hansson

[11] Patent Number: 4,553,436
[45] Date of Patent: Nov. 19, 1985

[54] SILICON ACCELEROMETER

[75] Inventor: Jan I. Hansson, Dallas, Tex.

[73] Assignee: Texas Instruments Incorporated, Dallas, Tex.

[21] Appl. No.: 440,462

[22] Filed: Nov. 9, 1982

[51] Int. Cl.$^4$ .............................................. G01P 15/12
[52] U.S. Cl. ..................................... 73/517 R; 338/46
[58] Field of Search .................... 73/516 R, 517 R; 338/43, 46, 47

[56] References Cited

U.S. PATENT DOCUMENTS

| 2,963,911 | 12/1960 | Pratt et al. | 73/517 R |
| 3,478,605 | 11/1969 | Siegel | 73/517 B |
| 4,071,838 | 1/1978 | Block | 73/517 R X |

FOREIGN PATENT DOCUMENTS

| 1000456 | 8/1965 | United Kingdom | 73/517 R |
| 534694 | 1/1977 | U.S.S.R. | 73/517 R |

Primary Examiner—James J. Gill
Attorney, Agent, or Firm—Richard A. Bachand; N. Rhys Merrett; Melvin Sharp

[57] ABSTRACT

A silicon accelerometer employing the piezoresistive effect of single crystal silicon to measure the flexure of semiconductor beams supporting a semiconductor mass. In one embodiment a rectangular semiconductor center mass is supported at each corner by a semiconductor beam parallel to one side of the center mass and perpendicular to the adjacent beams, each of the beams having an implanted resistor at the stationary end thereof. The crystal planes and relative orientations of the resistors are selected so that two resistors always increase, and two always decrease their resistance by the same amount as the center mass is displaced, which allows them to be connected in a Wheatstone bridge having a symmetric differential output.

6 Claims, 11 Drawing Figures

SILICON ACCELEROMETER

BACKGROUND OF THE INVENTION

The present invention relates to semiconductor acceleration sensors and specifically to such sensors which employ the piezoresistive effect of single crystal silicon.

Semiconductor accelerometers are particularly useful for biomedical, aerospace and automotive applications. The basic semiconductor accelerometer of the prior art comprises a cantilevered silicon beam and mass with a resistor implanted on the beam which changes its value with acceleration due to the stress induced in the beam. A second resistor may be included on the unstressed portion of the structure for temperature compensation and the two resistors connected together to form a half-bridge circuit. One such device is described by L. Roylance and J. Angell in an article entitled "A Batch-Fabricated Silicon Accelerometer", I.E.E.E. Transactions on Electron Devices, vol. ED-26, No. 12, December 1979, pp. 1911-1917.

Another prior accelerometer includes a double-mass and employs the tensile and compressive loading of resistors simultaneously. However, this results in an asymmetric response, and metallization on the flexible portion of the device induces thermal deformation which contributes to nonlinearity and accuracy.

There is thus a need for a low-cost, accurate and sensitive semiconductor accelerometer which can be mass-produced using standard planar processing techniques.

SUMMARY OF THE INVENTION

Accordingly, the present invention provides a semiconductor accelerometer and a process for the fabrication thereof which overcomes many of the disadvantages of prior art devices.

In one embodiment of the present invention a rectangular silicon center mass is supported at each corner by a silicon beam parallel to one side of the center mass and perpendicular to the adjacent beams, each of the beams having an implanted resistor at the stationary end thereof. The crystal planes and the relative orientations of the resistors are selected so that two resistors always increase, and two always decrease their resistance by the same amount as the center mass is displaced, which allows them to be connected in a Wheatstone bridge circuit having a symmetric differential output.

BRIEF DESCRIPTION OF THE DRAWINGS

Other objects and advantages of the present invention will become apparent, and the invention will be better understood, by reference to the following detailed description and claims when read in conjunction with the following drawings in which like reference numerals represent the same or similar elements throughout the several views, and wherein:

DETAILED DESCRIPTION OF THE INVENTION

Figure 1:
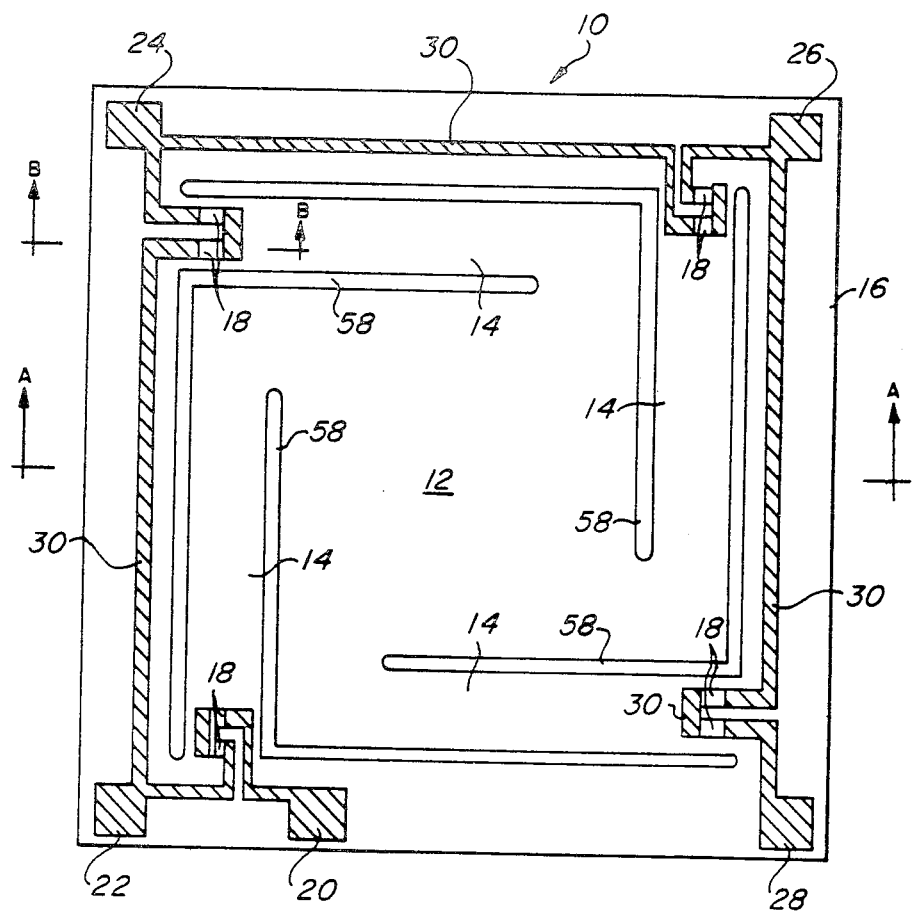
FIG. 1 is a plan view of a semiconductor accelerometer according to one embodiment of the present invention.
Figure 2:
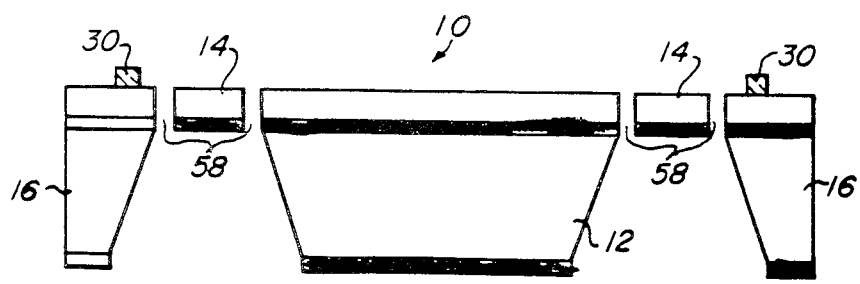
FIG. 2 is a cross-sectional view of the accelerometer of FIG. 1 taken along line A—A.

Referring now to the drawings, there is shown in FIG. 1 a semiconductor accelerometer 10 according to the present invention. Accelerometer 10, referring also to FIG. 2, is formed of silicon and comprises a rectangular center mass portion 12 supported at its corners by four thin, flexible, perpendicular beams 14 each of which is attached at one end to center mass 12 and at the other end to a stationary rim 16. Disposed near the stationary end of each beam 14 is a resistor element 18 composed of semiconductor material of a conductivity type opposite that of beam 14, center mass 12, and rim 16. Each resistor 18 may conveniently be formed of two parallel portions, as shown in FIG. 1, to provide a compact resistance element of the desired value. Also disposed on the surface of accelerometer 10 are metal contact pads 20, 22, 24, 26 and 28, and metal interconnect lines 30 which are in ohmic contacct with resistors 18 for providing contact thereto and to external devices when accelerometer 10 is assembled in a package. Interconnect lines 30 also provide contact to the separate elements of each resistor 18.

The symmetrical formation of beams 14 at the periphery of center mass 12 provides a stable, compact structure which is sensitive to acceleration perpendicular to the surface of the mass 12, while it is particularly insensitive to cross-axis acceleration. Further, the disposition of resistors 18 at the stationary ends of beams 14 eliminates any parasitic thermal stress, or bimetal, effects.

Figure 3:
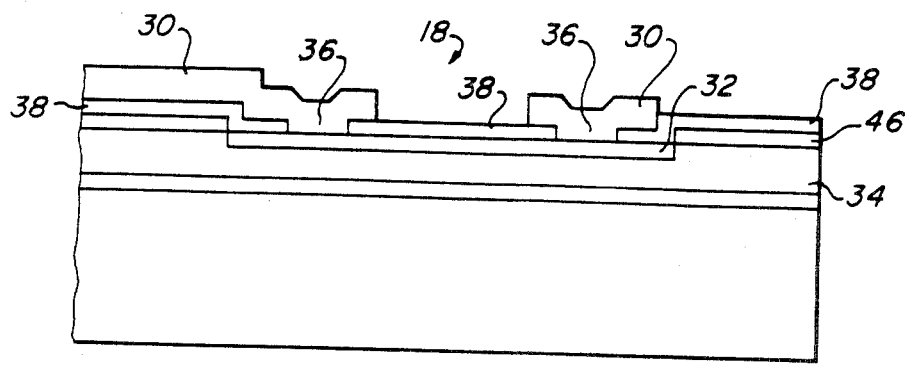
FIG. 3 is an enlarged cross-sectional view of the accelerometer of FIG. 1 taken along line B—B showing the resistor structure in greater detail.

FIG. 3 shows a resistor 18 in greater detail. Each resistor is formed by implanting a dopant of one conductivity type in an epitaxial layer of the other conductivity type, for example, a p-type region 32 is formed in an n-type epitaxial layer 34. Contact windows 36 in an oxide layer 38 provide for ohmic contact to each end of the p-type region 32 by metal interconnect lines 30 as described above.

Figure 4A:
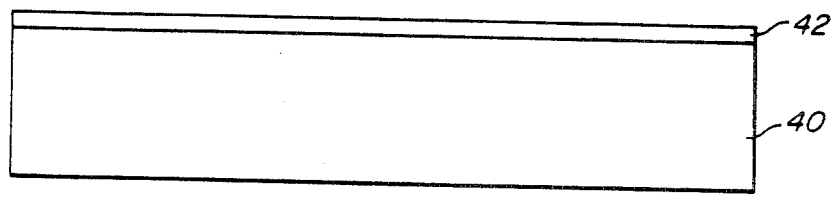
FIGS. 4a–4g are cross-sectional views of the accelerometer of FIG. 1 showing various stages in the fabrication thereof.
Figure 4B:
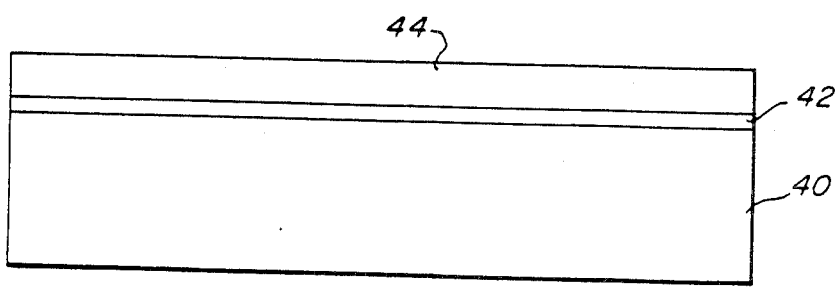
Figure 4C:
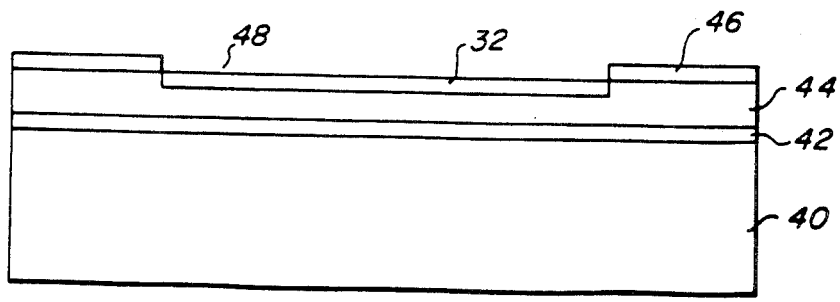
Figure 4D:
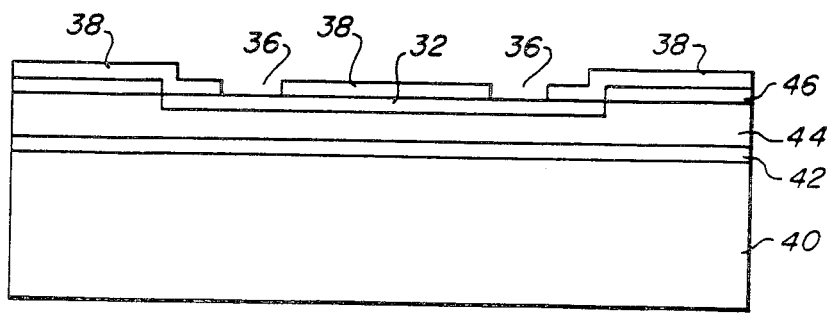

Referring now to FIGS. 4a–4d, corresponding to the cross section taken along line B—B in FIG. 1, the structure illustrated in FIGS. 1-3 may be formed by the following method. The starting material is an n-type silicon substrate 40 having a (1,0,0) crystal orientation and a resistivity of about 1–10 ohm-cm. A highly doped p++ region 42 is formed in substrate 40, for example, by boron deposition at about 1150 degrees C. Region 42 serves as an etch stop as will be described below. Next, an n-type epitaxial layer 44 is grown on the surface of substrate 40 over region 42 as shown in FIG. 4b. Layer 44 is approximately 0.5–1.0 ohm-cm. and has a thickness of about 10 microns. This defines the thickness of beams 14 and provides a background for resistors 18. An insulating layer 46, e.g., silicon dioxide, is then thermally grown on layer 44 at a temperature of about 1000 degrees C. to a thickness of about 3000 Angstroms. Openings 48 are formed in oxide layer 46 by any known method to form a pattern for resistors 18, which are formed as shown in FIG. 4c by a boron implant at a density of about $10^{14}$ atoms per $cm^2$. P-type resistors 18 are composed of regions 32 as described above. An oxide layer 38 is formed by plasma deposition to a thickness of about 3000 Angstroms, followed by annealing at approximately 950 degrees C. to anneal the previous implant. Openings 36 are formed in oxide layer 38 as described above and shown in FIG. 4d, to form contact windows for the metal interconnect lines 30 as shown in FIG. 3.

Figure 4E:
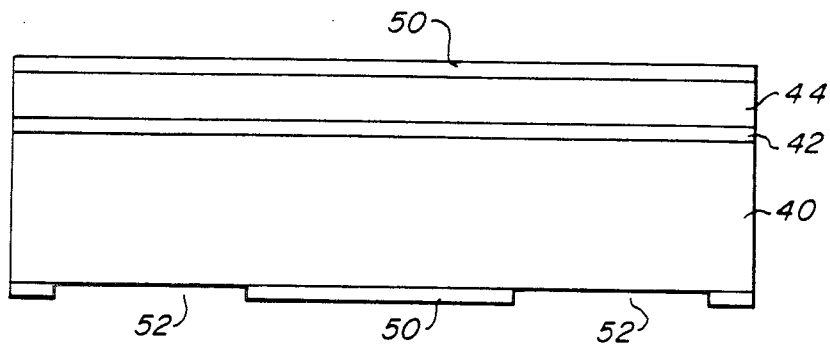
Figure 4F:
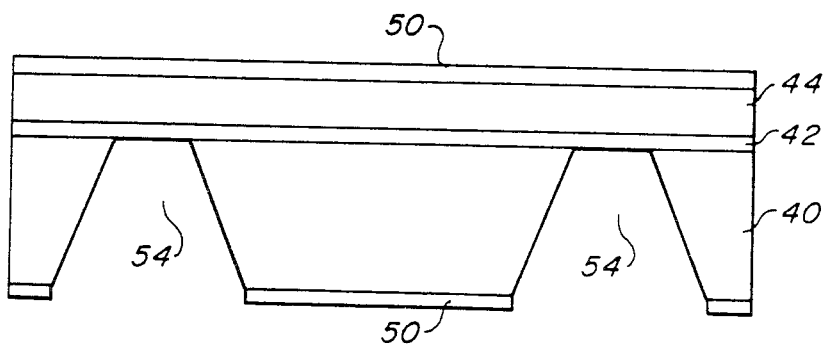
Figure 4G:
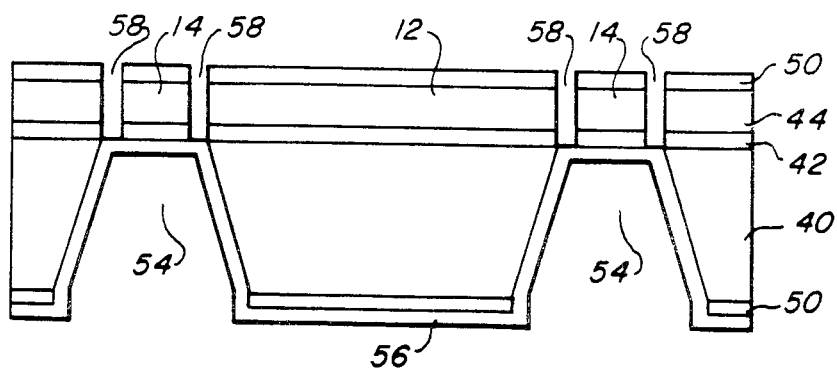

FIGS. 4e–4g, corresponding to the cross section taken along line A—A in FIG. 1, illustrate the steps in the formation of beams 14 and center mass 12. Substrate 40, p++ region 42 and epitaxial n-type layer 44 are formed simultaneously with the corresponding portions of resistors 18 as described above and shown in FIGS. 4a–4d. A layer 50 of nitride is deposited on both sides of the slice to a thickness of about 20,000 Angstroms, and then openings 52 are formed therein as shown in FIG. 4e. Layer 50 is preferably formed of compressive nitride which has the advantage of a low deposition temperature of about 350 degrees C. The nitride may therefore be deposited after the metal patterning to minimize the number of process steps required when the slices are relatively thin and fragile. Because of the built-in compressive stress, layer 50 is virtually pinhole-free and can be formed to a greater thickness without cracking as compared to conventional nitride. Further, compressive nitride is easily removed after plasma etching, which stops at the oxide layer 38 and metal interconnects 30 and 20–28, which must remain intact. Compressive nitride layer 50 may be formed by methods known in the art, for example the process described by A. K. Sinha et al. in the Journal of Electrochemistry, vol. 125, 1978, p. 601 et seq.

Openings 52 in the backside nitride layer 50 must be accurately aligned to the resistor 18 pattern previously formed on the front of the slice in order for the resistors 18 to be properly positioned at the stationary end of beams 14. One method of aligning the patterns is to form a plurality of alignment holes (not shown) completely through the slice. However, the preferred method is to use an infrared aligner whereby mask patterns on each side of the slice are aligned simultaneously. One such infrared aligner is available from Research Devices, Inc.

Referring to FIG. 4f, a cavity 54 which forms the center mass 12 and bottom portions of beams 14 is formed from the backside of the slice by means of an orientation dependent etch (ODE). An ODE etchant has a different rate of etching along different axes of the silicon crystal. It has been found that one particularly useful etchant is comprised of a 15 per cent mixture of KOH in water with N-propanol at a temperature of approximately 80 degrees C. for about five hours. The etchant automatically follows the (1,1,1) plane of the crystal to produce the sloped sidewalls as shown in FIG. 4f. The KOH etchant stops when it reaches the p++ layer 42. Next, the backside of the slice is coated with a photoresist layer 56 and a pattern is formed into nitride layer 50 on the frontside of the slice. This pattern is used to etch a plurality of slots 58 as shown in FIGS. 4g, 1 and 2, which define beams 14 and center mass 12. First, compressive nitride layer 50 is plasma etched followed by a wet etch of any underlying oxide. The slots are then formed by etching epitaxial layer 44 and p++ region 42 with a silicion etch, for example, a mixture of nitric acid and hydrofluoric acid. Resist layer 56 and the front side nitride layer 50 are then removed, resulting in the structure shown in FIG. 2. The backside nitride layer 50 may either be left on or removed prior to the assembly of accelerometer 10 in a package.

Figure 5:
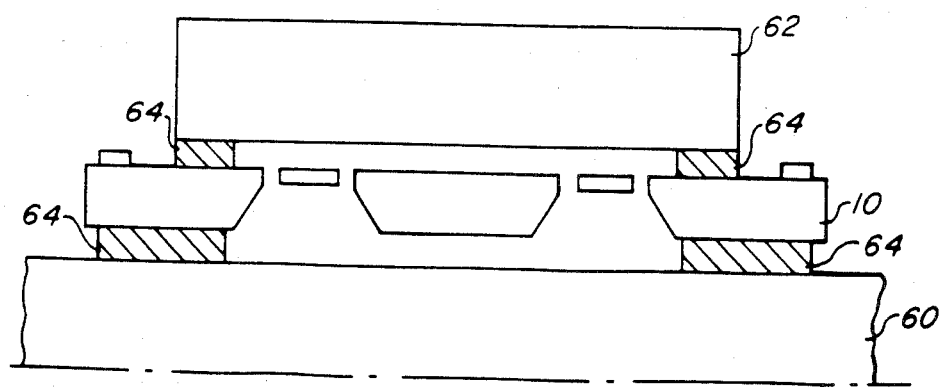
FIG. 5 is a cross-sectional view of an assembled accelerometer according to the present invention.

FIG. 5 shows one method of assembling accelerometer 10 in a package. Accelerometer 10 is first attached to a header 60 and then a cover 62 is attached thereto, both of which may be silicon. Prior art packaging techniques required indentations or depressions to be etched into header 60 and cover 62 to permit mass 12 to move. A preferred method, illustrated in FIG. 5, is to use an epoxy compound, generally shown by numeral 64, filled with glass beads having a diameter of about 2–4 mils. Header 60 and cover 62 will then be automatically and properly spaced from center mass 12, allowing it to move freely and additionally providing an overload protection device which restricts the movement of mass 12 past a predetermined point under excessive acceleration forces.

The sensitivity of an accelerometer fabricated as described above is approximately 0.2 mV/V/g. It will be readily understood the sensitivity, as well as the frequency response of the accelerometer may be varied by varying the dimensions of the device as known in the art and described, for example in the above Roylance et al. reference, as well as a publication by T. Nunn entitled "A Silicon Absolute Pressure Transducer For Biomedical Application", Stanford Electronics Laboratories Technical Report No. 4610-1, October 1977. There has thus been provided by the present invention a low-cost, sensitive and accurate semiconductor accelerometer suitable for mass production using standard planar semiconductor processing techniques.

What is claimed is:

1. An acceleration sensor comprising:
    a substantially planar semiconductor support frame;
    four flexible, elongate semiconductor support members each rigidly attached at a first end to said support frame, and disposed substantially perpendicular to each adjacent support member;
    a semiconductor deflection mass positioned internally of and movable relative to said support frame, in a direction perpendicular to the plane of said support frame, and attached to a second end of said support members; and
    piezoresistive means for sensing stress in said support members, said piezoresistive means oriented with respect to a crystalline plane and capable of providing a differential output as a function of the magnitude and direction of bending of said support members.

2. A sensor as set forth in claim 1 wherein said differential output comprises a Wheatstone bridge.

3. A method for fabricating an acceleration sensor comprising the steps of:
    providing a semiconductor substrate of one conductivity type;
    doping impurities of the opposite conductivity type into an upper surface of said substrate to form a buried layer therein;
    forming an epitaxial layer of the first conductivity type on the upper surface of said substrate over said buried layer;
    forming a first insulating layer on the surface of said epitaxial layer;
    forming a pattern of openings in said first insulating layer extending to the surface of said epitaxial layer, wherein the pattern of openings defines locations for piezoelectric resistive elements;
    doping impurities of the opposite conductivity type into the surface of said epitaxial layer within the pattern of openings to form doped resistive element regions;

forming a second insulating layer on the surfaces of said first insulating layer, said epitaxial layer and said doped resistive element regions;

forming a pattern of openings in said second insulating layer;

forming a pattern of conducting elements over said pattern of openings in said second insulating layer wherein the conducting elements make contact with the resistive element regions;

forming a third insulating layer on a lower surface of said substrate and on the exposed surfaces of said second insulating layer and said conducting elements;

forming a pattern of openings in said third insulating layer on the lower surface of the substrate to define locations for support members and for a deflection mass;

etching said substrate on the lower side to form a pattern of channels therein extending to said buried layer;

forming a pattern of openings in said third insulating layer adjacent said epitaxial layer aligned with said channels to define the support members and the deflection mass;

etching said third insulating layer, said epitaxial layer and said buried layer to separate the deflection mass from the remainder of the substrate, and to separate the support members from the remainder of the substrate and from the deflection mass; and removing said third and fourth insulating layers.

4. The method of claim 3 wherein said first etching step comprises an orientation dependent etch.

5. The method of claim 4, further including the steps of:

attaching said sensor to a header; and affixing a cover to the surface of said sensor opposite said header and said cover by means of a nonconducting adhesive compound including a plurality of nonconducting spacer elements therein of a predetermined size.

6. The method of claim 4 wherein said step of forming a third insulating layer comprises forming a layer of compressive nitride.

* * * * *

UNITED STATES PATENT AND TRADEMARK OFFICE
CERTIFICATE OF CORRECTION

PATENT NO. : 4,553,436
DATED : November 19, 1985
INVENTOR(S) : Jan I. Hansson

It is certified that error appears in the above-identified patent and that said Letters Patent is hereby corrected as shown below:

In the drawing, Figure 2 should be deleted to appear as per attached sheet.

Signed and Sealed this

Eleventh Day of March 1986

[SEAL]

Attest:

DONALD J. QUIGG

Attesting Officer

Commissioner of Patents and Trademarks

UNITED STATES PATENT OFFICE
CERTIFICATE OF CORRECTION Page 2 of 2

Patent No. 4,553,436          Dated November 19, 1985

Inventor(s) Jan I. Hansson

It is certified that error appears in the above-identified patent and that said Letters Patent are hereby corrected as shown below:

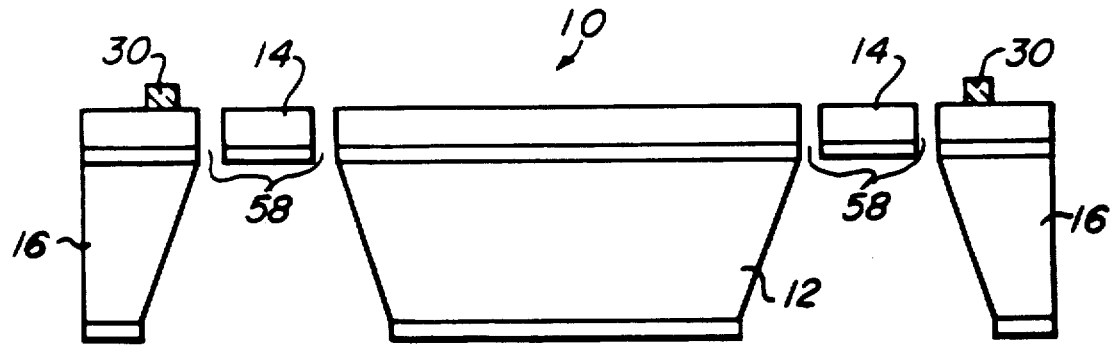

Fig. 2